United States Patent
Machida

(10) Patent No.: US 9,015,675 B2
(45) Date of Patent: Apr. 21, 2015

(54) SYSTEM RELIABILITY EVALUATION DEVICE

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 13/640,454

(22) PCT Filed: Jan. 21, 2011

(86) PCT No.: PCT/JP2011/000303
§ 371 (c)(1),
(2), (4) Date: Oct. 10, 2012

(87) PCT Pub. No.: WO2011/129038
PCT Pub. Date: Oct. 20, 2011

(65) Prior Publication Data
US 2013/0031533 A1    Jan. 31, 2013

(30) Foreign Application Priority Data
Apr. 13, 2010   (JP) .................. 2010-091956

(51) Int. Cl.
*G06F 9/44*     (2006.01)
*G06F 11/10*    (2006.01)
*G06F 11/36*    (2006.01)

(52) U.S. Cl.
CPC ........ *G06F 11/3692* (2013.01); *G06F 11/3684* (2013.01); *G06F 11/3664* (2013.01)

(58) Field of Classification Search
CPC .............. G06F 11/008; G06F 11/3676; G06F 11/3616; G06F 11/3684; G06F 8/77; G06F 9/5055
See application file for complete search history.

(56) References Cited

U.S. PATENT DOCUMENTS

| | | | |
|---|---|---|---|
| 5,548,718 A | * | 8/1996 | Siegel et al. .................. 714/38.1 |
| 7,861,226 B1 | * | 12/2010 | Episkopos et al. ............ 717/124 |
| 2004/0230858 A1 | * | 11/2004 | Susskind ............................ 714/1 |
| 2004/0230872 A1 | * | 11/2004 | Mullally et al. ................ 714/38 |
| 2004/0230953 A1 | * | 11/2004 | Garzia et al. ................... 717/124 |
| 2007/0016840 A1 | * | 1/2007 | Zurawka et al. .............. 714/776 |
| 2007/0226546 A1 | * | 9/2007 | Asthana et al. ................. 714/47 |
| 2008/0313501 A1 | * | 12/2008 | Lin et al. ......................... 714/38 |

(Continued)

FOREIGN PATENT DOCUMENTS

| | | |
|---|---|---|
| JP | 05-282178 A | 10/1993 |
| JP | 2000-215045 A | 8/2000 |

(Continued)

OTHER PUBLICATIONS

Bev Littlewood et al.; Evaluation of Competing Software Reliability Predictions; 1986 IEEE; pp. 950-967; <http://ieeexplore.ieee.org/stamp/stamp.jsp?tp=&arnumber=6313050>.*

(Continued)

*Primary Examiner* — Thuy Dao
*Assistant Examiner* — Cuong V Luu
(74) *Attorney, Agent, or Firm* — Sughrue Mion, PLLC

(57) ABSTRACT

A system reliability evaluation device 1000 includes a system reliability evaluating part 1100 that, based on connection defect information including the number of times that a defect has occurred in a connection between software components among a plurality of software components operating in connection with each other, evaluates system reliability which is the reliability of an information processing system executing the software.

9 Claims, 17 Drawing Sheets

(56) References Cited

U.S. PATENT DOCUMENTS

2010/0287412 A1* 11/2010 Cha et al. .................. 714/35
2011/0061041 A1* 3/2011 Hellebro et al. ............. 717/120

FOREIGN PATENT DOCUMENTS

| | | |
|---|---|---|
| JP | 2005-063208 A | 3/2005 |
| JP | 2006-099308 A | 4/2006 |
| JP | 2008-171318 A | 7/2008 |

OTHER PUBLICATIONS

John D. Musa; A theory of software reliability and its application; 1975 IEEE; pp. 312-327; <http://ieeexplore.ieee.org/xpls/abs_all.jsp?arnumber=6312856>.*

Jean-Claude Laprie; For a Product-in-a-Process Approach to Software Reliability Evaluation; 1992 IEEE; pp. 134-139; <http://ieeexplore.ieee.org/stamp/stamp.jsp?tp=&arnumber=285851>.*

J. D. Musa; A logarithmic poisson execution time model for software reliability measurement; 1984 IEEE; pp. 230-238; <http://dl.acm.org/citation.cfm?id=801975>.*

M. R. Bastos Martini et al.; Software-Reliability Evaluation of the TROPICO-R Switching System; 1990 IEEE; pp. 369-379; <http://ieeexplore.ieee.org/stamp/stamp.jsp?tp=&arnumber=103020>.*

Kishor S. Trivedi et al.; Architecture-based approach to reliability assessment of software systems; 2001 Elvevier Science; pp. 179-204; <http://www.sciencedirect.com/science/article/pii/S0166531601000347#>.*

Gokhale, Swapna, et al., "Analytical Models for Architecture-based Software Reliability Prediction: A Unification Framework," IEEE Transactions on Reliability, The Institute of Electrical and Electronics Engineers, Inc., :2006, pp. 578-590, vol. 55, No. 4.

* cited by examiner

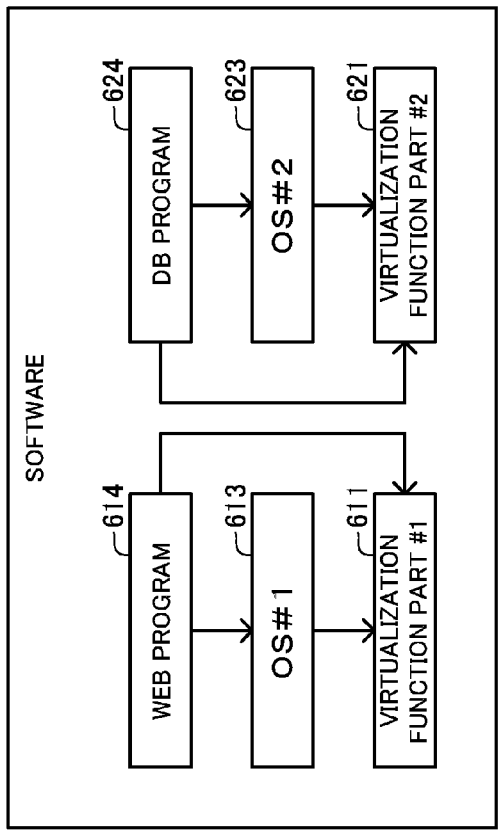

Fig.16

| COMPONENT CONNECTION | TIME AND DATE | NUMBER OF EXECUTIONS | DETAILS |
|---|---|---|---|
| WEB PROGRAM →DB PROGRAM | 2010/2/12 10:20 | 5 | BECAUSE TABLE STORING USER INFORMATION HAS BEEN SET WRONGFULLY |
| WEB PROGRAM →DB PROGRAM | 2010/2/12 11:45 | 120 | BECAUSE ARGUMENT COUNT OF FUNCTION IS DIFFERENT |
| ... | ... | ... | ... |

Fig.18

| HARDWARE | DEVICE | HARDWARE RELIABILITY |
|---|---|---|
| PHYSICAL MACHINE #1 | CPU | 0.99997 |
| PHYSICAL MACHINE #1 | MEMORY | 0.99995 |
| ⋮ | ⋮ | ⋮ |

Fig.19

| COMPONENT | SOFTWARE RELIABILITY |
|---|---|
| WEB PROGRAM | 0.9995 |
| DB PROGRAM | 0.9998 |
| OS#1 | 0.9999 |
| ⋮ | ⋮ |

Fig.20

| COMPONENT CONNECTION | SOFTWARE CONNECTION RELIABILITY |
|---|---|
| WEB PROGRAM → DB PROGRAM | 0.9995 |
| WEB PROGRAM → OS#1 | 0.9998 |
| OS#1 → VIRTUALIZATION FUNCTION PART#1 | 0.9999 |
| ⋮ | ⋮ | ized phenomenon that software reliability gradually increases as the

SYSTEM RELIABILITY EVALUATION DEVICE

CROSS REFERENCE TO RELATED APPLICATIONS

This application is a National Stage of International Application No. PCT/JP2011/000303, filed on Jan. 21, 2011, which claims priority based on Japanese Patent Application No. 2010-091956, filed Apr. 13, 2010, the contents of which are incorporated herein by reference in their entirety.

TECHNICAL FIELD

The present invention relates to a system reliability evaluation device configured to evaluate the reliability of an information processing system executing software.

BACKGROUND ART

In general, the reliability of an information processing system executing software (application program) is evaluated in a test executed after development of the software. A defect (a bug) of software causing a fault is found in the test and then corrected. The total number of found bugs becomes larger during a period that tests are executed in accordance with the number of executed tests.

The number of bugs found in one test generally decreases as the number of executed tests (i.e., the number of bugs corrected after the tests) increases. Then, when the number of executed tests reaches a relatively large number, the number of bugs found in one test becomes small enough.

Patent Document 1 discloses a technique of calculating software reliability (a value representing the degree of reliability of software) based on a model representing the abovementioned phenomenon. This model, which represents a phenomenon that software reliability gradually increases as the number of executed tests increases, is called a software reliability growth model. A system reliability evaluation device using this technique evaluates the reliability of an information processing system executing software (i.e., system reliability), by using the software reliability growth model.

On the other hand, software is generally configured by combining a plurality of software components operating in connection with (in cooperation with) each other. Patent Document 2 discloses a technique of calculating the software reliability of each of the software components based on information on a defect occurring in only the software component.

Further, Non-Patent Document 1 discloses a technique of structuring a model that represents the architecture of software in which a plurality of software components are combined, a relation in which one of a plurality of software components calls another (i.e., a call relation), and the like, and evaluating system reliability based on the model.

[Patent Document 1] Japanese Unexamined Patent Application Publication No. 2005-63208
[Patent Document 2] Japanese Unexamined Patent Application Publication No. 2006-99308
[Non-Patent Document 1] S. Gokhale, K. S. Trivedi, "Analytical Models for Architecture-Based Software Reliability Prediction: A unification Framework," IEEE Transactions on Reliability, The Institute of Electrical and Electronics Engineers, Inc., 2006, vol. 55, issue 4, pp. 578 to 590

Defects occurring in software include a defect occurring in a connection between software components. Moreover, a relation between a defect occurring in a connection between software components and system reliability may be different from a relation between a defect occurring in the entire software and system reliability, or may be different from a relation between a defect occurring in only each of the software components and system reliability.

Therefore, in a case that a system reliability evaluation device is configured to evaluate system reliability based on a defect occurring in only each of the software components or a defect occurring in the entire software, there is a case that the system reliability evaluation device cannot evaluate system reliability with high accuracy.

Further, it is relatively difficult to structure a model that accurately represents a configuration of software in which a plurality of software components are combined, a call relation, and the like. Furthermore, there is a problem that processing load on a system reliability evaluation device for evaluating system reliability based on such a model is relatively large.

SUMMARY

Accordingly, an object of the present invention is to provide a system reliability evaluation device that is capable of solving the abovementioned problems, "processing load for evaluating system reliability becomes too large" and "there is a case that system reliability cannot be evaluated with high accuracy."

In order to achieve the object, a system reliability evaluation device according to an exemplary embodiment of the present invention includes a system reliability evaluating means for evaluating system reliability which is reliability of an information processing system executing software, based on connection defect information including a number of times that a defect has occurred in a connection between software components among a plurality of software components operating in connection with each other.

Further, a system reliability evaluation system according to another exemplary embodiment of the present invention includes a system reliability evaluating means for evaluating system reliability which is reliability of an information processing system executing software, based on connection defect information including a number of times that a defect has occurred in a connection between software components among a plurality of software components operating in connection with each other.

Further, a system reliability evaluation method according to another exemplary embodiment of the present invention is a method including evaluating system reliability which is reliability of an information processing system executing software, based on connection defect information including a number of times that a defect has occurred in a connection between software components among a plurality of software components operating in connection with each other.

Further, a recording medium according to another exemplary embodiment of the present invention is a computer-readable recording medium storing a system reliability evaluation program comprising instructions for causing an information processing device to realize a system reliability evaluating means for evaluating system reliability which is reliability of an information processing system executing software, based on connection defect information including a number of times that a defect has occurred in a connection between software components among a plurality of software components operating in connection with each other.

With the configurations of the present invention as described above, it is possible to evaluate system reliability with high accuracy while preventing processing load for evaluating system reliability from becoming too large.

BRIEF DESCRIPTION OF DRAWINGS

FIG. 14 is an explanation view conceptually showing a direct call relation pair and an indirect call relation pair specified by the call relation extracting part according to the fourth exemplary embodiment of the present invention;

FIG. 15 is a table showing an example of lone defect occurrence information according to the fourth exemplary embodiment of the present invention;

FIG. 16 is a table showing an example of connection defect occurrence information according to the fourth exemplary embodiment of the present invention;

FIG. 18 is a table showing an example of hardware reliability stored by a hardware reliability storing part according to the fourth exemplary embodiment of the present invention;

FIG. 19 is a table showing an example of software reliability calculated by a software reliability calculating part according to the fourth exemplary embodiment of the present invention;

FIG. 20 is a table showing an example of software connection reliability calculated by a software connection reliability calculating part according to the fourth exemplary embodiment of the present invention.

EXEMPLARY EMBODIMENTS

Below, respective exemplary embodiments of a system reliability evaluation device, a system reliability evaluation system, a system reliability evaluation method and a recording medium according to the present invention will be described with reference to FIGS. 1 to 21.

First Exemplary Embodiment

Configuration

Figure 1:
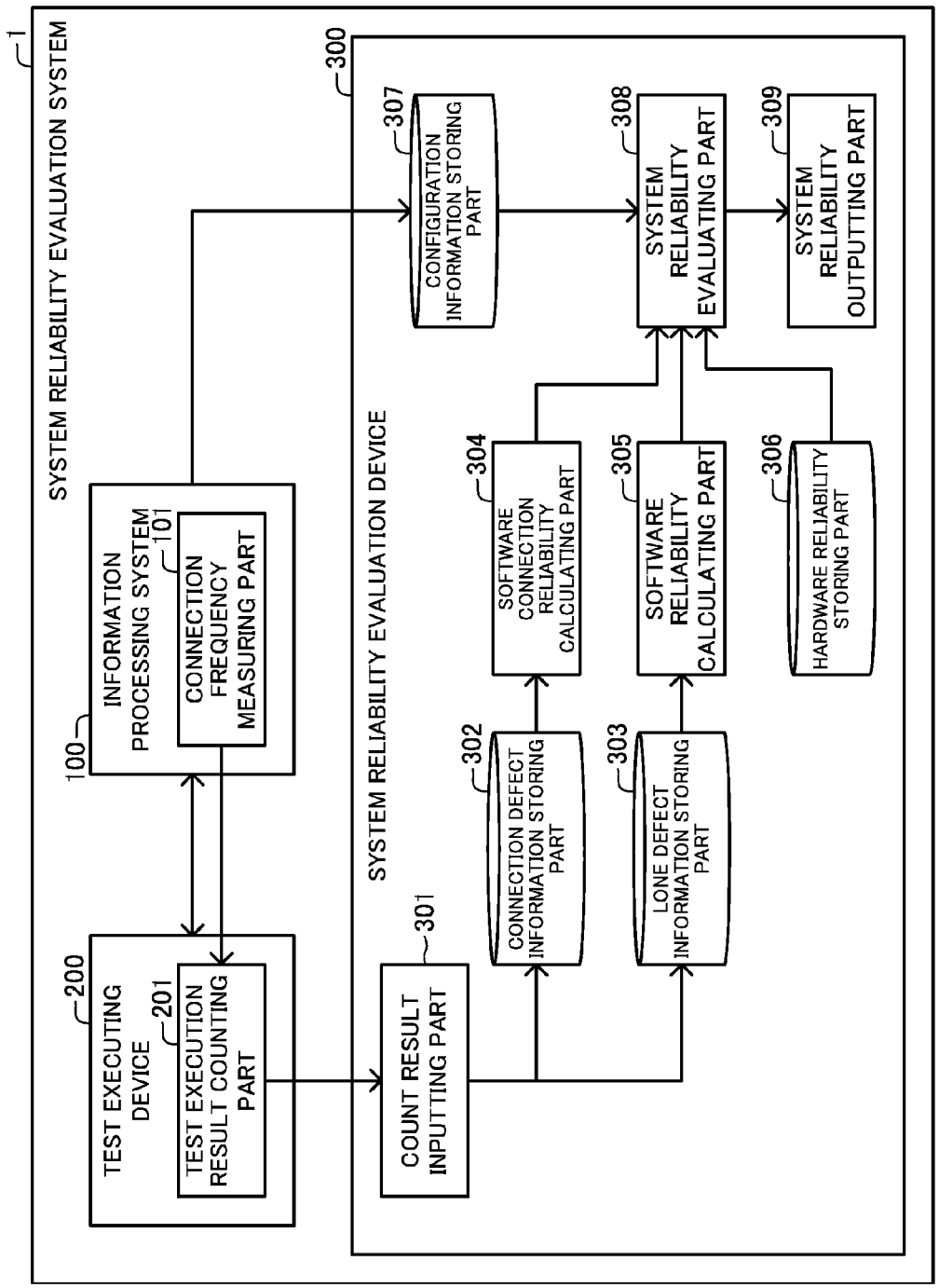
FIG. 1 is a block diagram showing an outline of a function of a system reliability evaluation system according to a first exemplary embodiment of the present invention.

As shown in FIG. 1, a system reliability evaluation system 1 in a first exemplary embodiment includes an information processing system 100, a test executing device (a test executing means) 200, and a system reliability evaluation device 300. Moreover, the information processing system 100, the test executing device 200 and the system reliability evaluation device 300 are connected so as to be capable of communication with each other.

Each of the information processing system 100, the test executing device 200 and the system reliability evaluation device 300 is an information processing device. The information processing system 100 may include a plurality of information processing devices. Moreover, the information processing system 100, the test executing device 200 and the system reliability evaluation device 300 may be configured by one information processing device. Moreover, any combination of the information processing system 100, the test executing device 200 and the system reliability evaluation device 300 may be configured by one information processing device.

Each of the information processing system 100, the test executing device 200 and the system reliability evaluation device 300 includes a central processing unit (CPU), a storage device (a memory and a hard disk drive (HDD)), an input device (a mouse, a keyboard, or the like in this exemplary embodiment), and an output device (a display, or the like in this exemplary embodiment), which are not shown in the drawings.

Each of the information processing system 100, the test executing device 200 and the system reliability evaluation device 300 is configured to realize a function described later by CPU's execution of a program stored in the storage device.

(Function)

FIG. 1 is a block diagram showing a function of the system reliability evaluation system 1 configured as described above. This function is realized by execution of a program or the like represented by flowcharts shown in FIGS. 2 to 5 described later by the CPUs of the information processing devices configuring the system reliability evaluation system 1.

The information processing system 100 executes software (an application program) that is a target of evaluation of system reliability. Software is configured by a plurality of software components operating in connection with each other.

That is to say, at least one software component (a first software component) of the plurality of software components directly calls another one software component (a second software component) of the plurality of software components. At this moment, the first software component transmits and receives data and/or messages (command and the like) to and from the second software component.

For example, in a case that the software is compliant with J2EE (Java™ 2 Platform, Enterprise Edition), the software components thereof are EJB (Enterprise Java Beans) components, Web components, and the like.

The information processing system 100 includes a connection frequency measuring part (a connection frequency measuring means) 101.

The connection frequency measuring part 101 measures the number of times that a connection between software components has been executed. In this exemplary embodiment, a connection between software components is transmission and reception of data and/or messages between software components.

The test executing device 200 causes the software executed by the information processing system 100 to execute a predetermined test process, and also judges whether the execution of the test process is normally completed or not.

In this exemplary embodiment, the test executing device 200 previously stores a value (an execution result predetermined value) that is predetermined (expected) as the execution result of the test process. Then, the test executing device 200 judges that the execution of the test process has been normally completed when the execution result of the test process outputted from the software executed by the information processing system 100 coincides with the execution result predetermined value, whereas judges that the execution of the test process has not been normally completed when the execution result of the test process does not coincide with the execution result predetermined value.

When judging that the execution of the test process has not been normally completed, the test executing device 200 informs occurrence of a defect (a fault) to the user of the system reliability evaluation system 1. In this exemplary embodiment, the test executing device 200 causes an output device to output information representing occurrence of a defect.

The user specifies the type of the defect based on the outputted information. In this exemplary embodiment, the types of defects include a first type which is a defect occurring in only a certain software component and a second type which is a defect occurring in a connection between software components.

Occurrence of a defect between software components results from, for example, incorrect setting of an environment variable, which is a variable defining an environment in which software operates, incorrect setting of information specifying the operation of the software (e.g., information within a configuration file), incorrect setting of access permission between software components, inconsistency of formats of data transmitted and received between software components, inconsistency of operation environments between software components, or the like.

To be specific, the user specifies the type of the defect based on log information outputted from the software executed by the information processing system 100 (e.g., information outputted from each of the software components).

In a case that the defect based on the outputted information is specified as a defect occurring in only a certain software component, the user inputs lone defect occurrence information via an input device.

Lone defect occurrence information includes information for specifying a software component in which the defect has occurred and the time and date of occurrence of the defect. Moreover, the lone defect occurrence information may include information for specifying the user having caused to execute the test process, information representing the content of the test process (i.e., a test scenario), the number of times that the test process has been executed, and the like.

The test executing device 200 accepts the lone defect occurrence information inputted by the user, and causes a storage device to store the accepted lone defect occurrence information.

In a case that the defect based on the outputted information is specified as a defect occurring in a connection between software components, the user inputs connection defect occurrence information via the input device.

Connection defect occurrence information includes information for specifying a pair of software components being connected in which the defect has occurred, and the time and date of occurrence of the defect. Moreover, the connection defect occurrence information may include information for specifying the user having executed the test process, information representing the content of the test process (i.e., a test scenario), the number of times that the test process has been executed, and the like.

The test executing device 200 accepts the connection defect occurrence information inputted by the user, and causes the storage device to store the accepted connection defect occurrence information.

The test executing device 200 includes a test execution result counting part 201.

The test execution result counting part 201 counts lone defect occurrence information and connection defect occurrence information stored in the storage device.

To be specific, the test execution result counting part 201 generates lone defect information with respect to each of all the software components configuring the software. Lone defect information includes the number of the stored lone defect occurrence information (i.e., the number of times that a defect has occurred in only the software component) and the number of times that the test process has been executed.

Further, the test execution result counting part 201 generates connection defect information with respect to each of all pairs of software components configuring the software. Connection defect information includes the number of the stored connection defect occurrence information (i.e., the number of times that a defect has occurred in a connection between the pair of software components), and the number of times of connections between the pair of software components measured by a connection frequency measuring part 101.

The system reliability evaluation device 300 evaluates system reliability that is the reliability of the information processing system 100 executing the software, based on the lone defect information and the connection defect information generated by the test execution result counting part 201.

The system reliability evaluation device 300 includes a count result inputting part 301, a connection defect information storing part 302, a lone defect information storing part 303, a software connection reliability calculating part 304, a software reliability calculating part 305, a hardware reliability storing part 306, a configuration information storing part 307, a system reliability evaluating part 308, and a system reliability outputting part 309.

The count result inputting part 301 inputs (accepts) the lone defect information and the connection defect information generated by the test execution result counting part 201. The count result inputting part 301 stores the inputted connection defect information into the connection defect information storing part 302, and also stores the inputted lone defect information into the lone defect information storing part 303.

The connection defect information storing part 302 stores connection defect information. The lone defect information storing part 303 stores lone defect information.

The software connection reliability calculating part 304 calculates software connection reliability based on the connection defect information stored in the connection defect information storing part 302. Software connection reliability is a value representing the degree of reliability of a connection between software components.

In this exemplary embodiment, the software connection reliability calculating part 304 estimates, based on the connection defect information, a connection model parameter which is a parameter for specifying a model representing a relation between the number of times that a connection has been executed between software components and the number of times that a defect has occurred in the connection.

In this exemplary embodiment, the model is a software reliability growth model shown by the following equation (1).

$$\Delta N_k = ab(1-b)^k \quad (1)$$

Herein, $\Delta N_k$ denotes the number of times that a defect occurs in a connection between software components executed $k^{th}$ time. Moreover, value a denotes the total number of defects existing in the connection between the software components (i.e., the number of all defects having actually occurred and all defects having not occurred yet). Moreover, value b denotes a probability regarding any one defect that the defect actually occurs (i.e., the defect is found by the user) in one connection. The values a and b configure connection model parameters.

That is to say, the software connection reliability calculating part 304 acquires a total number $N_k$ of defects having occurred in the connection between the software components before a moment that the connection has been executed k times, based on the connection defect information stored in the connection defect information storing part 302, and estimates the values a and b based on the acquired total number $N_k$ by maximum likelihood estimation or least squares method.

The software connection reliability calculating part 304 calculates software connection reliability by using a software reliability growth model specified by the estimated values a and b (i.e., the connection model parameters).

The software reliability calculating part 305 calculates software reliability based on the lone defect information stored in the lone defect information storing part 303. The software reliability is a value representing the degree of reliability of only each of the software components.

In this exemplary embodiment, in the same manner as the software connection reliability calculating part 304, the software reliability calculating part 305 estimates a lone model parameter which is a parameter for specifying a model representing a relation between the number of times that the test process has been executed, and the number of times that a defect has occurred in only the software component, based on the lone defect information. The software reliability calculating part 305 calculates software reliability by using a software reliability growth model specified by the estimated lone model parameter, in the same manner as the software connection reliability calculating part 304.

The hardware reliability storing part 306 previously stores hardware reliability calculated based on hardware defect information including the number of times that a defect has occurred in hardware in which the software is executed. Hardware reliability is a value representing the degree of reliability of hardware (i.e., the information processing system 100) in which the software is executed. For example, hardware reliability is calculated based on the failure rate of the hardware, the recovery rate in the event of failure, and the like. In this exemplary embodiment, the hardware reliability is a value that decreases as the failure rate of the hardware increases and that decreases as the recovery rate in the event of failure decreases.

The configuration information storing part 307 stores configuration information that includes information representing the configuration of hardware in which the software is executed, information representing the configuration of the software, and the like. The configuration information storing part 307 may be a function that a device outside the system reliability evaluation system 1 has. The configuration information may be information previously inputted by the user, or may be information automatically acquired by the system reliability evaluation system 1.

The system reliability evaluating part 308 evaluates the reliability (the system reliability) of the information processing system 100 executing the software (e.g., calculates a parameter representing the degree of the system reliability), based on the configuration information stored by the configuration information storing part 307, the software connection reliability calculated by the software connection reliability calculating part 304, the software reliability calculated by the software reliability calculating part 305, and the hardware reliability stored by the hardware reliability storing part 306.

In this exemplary embodiment, the system reliability evaluating part 308 calculates the operation rate of the information processing system 100 as the parameter representing the degree of the system reliability. The operation rate of the information processing system 100 is a ratio of a time that the information processing system 100 actually operates to a time having elapsed after the operation of the information processing system 100 has started. The system reliability evaluating part 308 may calculate, for example, a probability that the information processing system 100 can normally execute a requested process, as a parameter representing the degree of system reliability.

In this exemplary embodiment, the system reliability evaluating part 308 generates a reliability model for evaluating the system reliability based on the configuration information stored by the configuration information storing part 307. In this exemplary embodiment, the reliability model is a model based on a fault tree described in Patent Document 3.
Patent Document 3: Japanese Unexamined Patent Application Publication No. 2007-122639

The system reliability evaluating part 308 generates a reliability model for evaluating the system reliability based on a defect having occurred in the hardware, a defect having occurred in only a software component, and a defect having occurred in a connection between software components. Then, the system reliability evaluating part 308 calculates the operation rate of the information processing system 100 based on the generated reliability model, the software connection reliability, the software reliability, and the hardware reliability.

The system reliability outputting part 309 outputs the result of evaluation of the system reliability evaluated by the system reliability evaluating part 308 (in this exemplary embodiment, the operation rate of the information processing system 100), via the output device.

(Operation)

Next, an operation of the abovementioned system reliability evaluation system 1 will be described.

At first, with reference to a flowchart shown in FIG. 2, an operation of the system reliability evaluation system 1 at the time of execution of a test process will be described.

The test executing device 200 causes software executed by the information processing system 100 to execute a predetermined test process (step S101). To be specific, when a user inputs a command representing an instruction to execute a test process into the test executing device 200, the test executing device 200 causes the software executed by the information processing system 100 to execute the test process.

While the test process is being executed, the connection frequency measuring part 101 counts the number of times that a connection between each pair of software components (i.e., transmission and reception of data and/or messages (commands) between each pair of software components) has been executed (step S102). The connection frequency measuring part 101 counts the abovementioned number of times for each pair of software components.

Upon completion of execution of the test process, the test executing device 200 judges whether the execution has been normally completed or not (step S103). In the case of judging "Yes," the test executing device 200 proceeds to step S107. In this case, the test executing device 200 stores the number of times that a connection has been executed between each pair of software components.

On the other hand, in the case of judging "No," the test executing device 200 proceeds to step S104. In this case, the test executing device 200 informs occurrence of a defect to the user of the system reliability evaluation system 1.

The user specifies the type of the defect based on the outputted information. Then, the user inputs defect occurrence information (lone defect occurrence information or connection defect occurrence information) via the input device. Consequently, the test executing device 200 stores the inputted defect occurrence information (step S105).

Then, the test execution result counting part 201 counts the lone defect occurrence information and the connection defect occurrence information stored in the storage device, thereby generating defect information (lone defect information and connection defect information) (step S106).

After that, the test executing device 200 proceeds to step S107, and stores the number of times that a connection has been executed between the software components.

When informed of occurrence of a defect, the user may correct a source code of the software, an environment variable, a configuration file or the like based on the defect. When correction is executed, the system reliability evaluation system 1 may be configured to immediately reflect the correction on the software executed by the information processing system 100.

Next, with reference to a flowchart shown in FIG. 3, an operation of the system reliability evaluation system 1 at the time of evaluation of the system reliability will be described.

The system reliability evaluating part 308 acquires (refers to) configuration information stored in the configuration information storing part 307 (step S201). Next, the system reliability evaluating part 308 generates a reliability model for evaluating the system reliability based on the acquired configuration information (step S202).

Moreover, the system reliability evaluating part 308 acquires hardware reliability stored in the hardware reliability storing part 306 (step S203). Then, the software reliability calculating part 305 calculates software reliability based on lone defect information stored in the lone defect information storing part 303 (step S204). The software reliability calculating part 305 calculates the software reliability with respect to each of all the software components configuring the software.

Next, the software connection reliability calculating part 304 calculates software connection reliability based on connection defect information stored in the connection defect information storing part 302 (step S205). The software connection reliability calculating part 304 calculates the software connection reliability with respect to each of all the pairs of the software components configuring the software.

The system reliability evaluating part 308 evaluates the system reliability based on the generated reliability model, the acquired hardware reliability, the calculated software reliability and the calculated software connection reliability (step S206). Then, the system reliability outputting part 309 outputs the result of evaluation of the system reliability via the output device (step S207).

Figure 4:
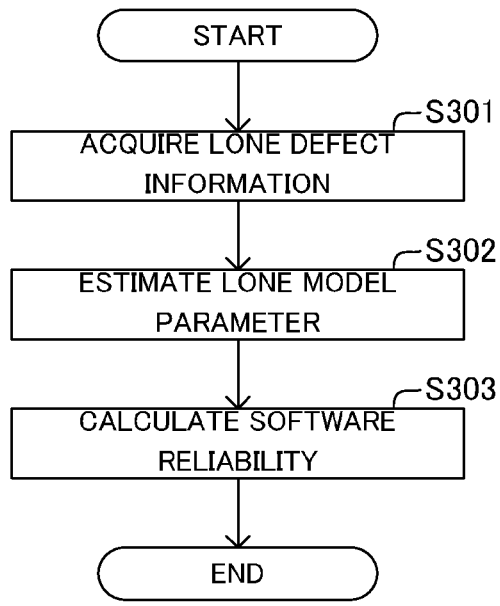
FIG. 4 is a flowchart showing an operation of the system reliability evaluation system according to the first exemplary embodiment of the present invention when calculating software reliability.

Next, with reference to a flowchart shown in FIG. 4, an operation of the system reliability evaluation system 1 at the time of calculation of the software reliability (i.e., the operation at step S204) will be described in more detail.

The software reliability calculating part 305 acquires lone defect information stored in the lone defect information storing part 303 (step S301). Then, the software reliability calculating part 305 estimates a lone model parameter based on the acquired lone defect information by using the maximum likelihood estimation or the least squares method (step S302).

Next, the software reliability calculating part 305 calculates the software reliability by using a software reliability growth model specified by the estimated lone model parameter (step S303).

In this exemplary embodiment, the software reliability calculating part 305 is configured to calculate the software reliability by using the software reliability growth model shown by the equation (1), but may be configured to calculate the software reliability by using other software reliability growth models. Other software reliability growth models are, for example, the Gompertz curve model, the logistic curve model, or the like described in Patent Document 1.

Further, the software reliability calculating part 305 may be configured to select one software reliability growth model based on lone defect information from among a plurality of software reliability growth models and calculate software reliability by using the selected software reliability growth model. A technique of selecting the software reliability growth model is disclosed in Patent Document 1.

Figure 5:
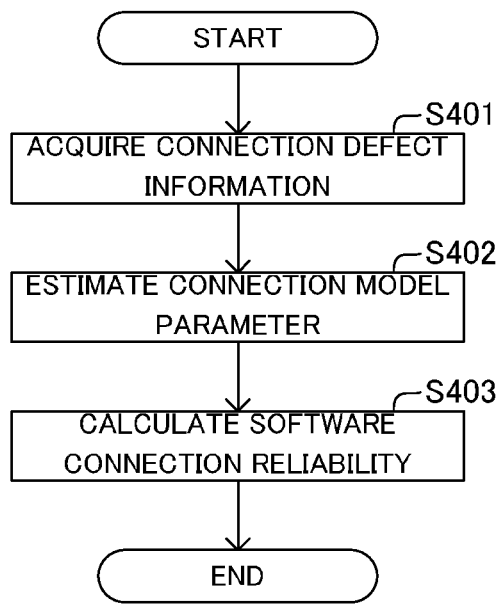
FIG. 5 is a flowchart showing an operation of the system reliability evaluation system according to the first exemplary embodiment of the present invention when calculating software reliability.

Next, with reference to a flowchart shown in FIG. 5, an operation of the system reliability evaluation system 1 at the time of calculation of software connection reliability (i.e., the operation at step S205) will be described in more detail.

The software connection reliability calculating part 304 acquires connection defect information stored in the connection defect information storing part 302 (step S401). Then, the software connection reliability calculating part 304 estimates a connection model parameter based on the acquired connection defect information by using the maximum likelihood estimation or the least squares method (step S402).

Next, the software connection reliability calculating part 304 calculates the software connection reliability by using a software reliability growth model specified by the estimated connection model parameter (step S403).

In this exemplary embodiment, the software connection reliability calculating part 304 is configured to calculate the software connection reliability by using the software reliability growth model shown by the equation (1), but may be configured to calculate the software connection reliability by using another software reliability growth model.

Further, the software connection reliability calculating part 304 may be configured to select one software reliability growth model based on connection defect information from among a plurality of software reliability growth models and calculate the software connection reliability by using the selected software reliability growth model.

As described above, according to the system reliability evaluation device 300 in the first exemplary embodiment of the present invention, it is possible to evaluate the system reliability based on the number of times that a defect has occurred in a connection between software components among a plurality of software components configuring software. As a result, it is possible to evaluate the system reliability with high accuracy (i.e., calculate a parameter representing the degree of the system reliability with high accuracy) while preventing processing load for evaluating the system reliability from becoming too large.

There is a case that a relation between the number of times that a defect has occurred in a connection between software components and system reliability is different from a relation between the number of times that a defect has occurred in the whole software and system reliability or different from a relation between the number of times of occurrence of a defect in only each software component and system reliability. Therefore, according to the system reliability evaluation device 300 configured as described above, it is possible to evaluate system reliability with higher accuracy.

Second Exemplary Embodiment

Next, a system reliability evaluation system according to a second exemplary embodiment of the present invention will be described. Unlike the system reliability evaluation system according to the first exemplary embodiment, the system reliability evaluation system according to the second exemplary embodiment detects occurrence of a defect in a case that software is being executed and evaluates system reliability based on defect information inputted based on the detected defect. Therefore, a description will be made below focusing on the different point.

(Function)

Figure 6:
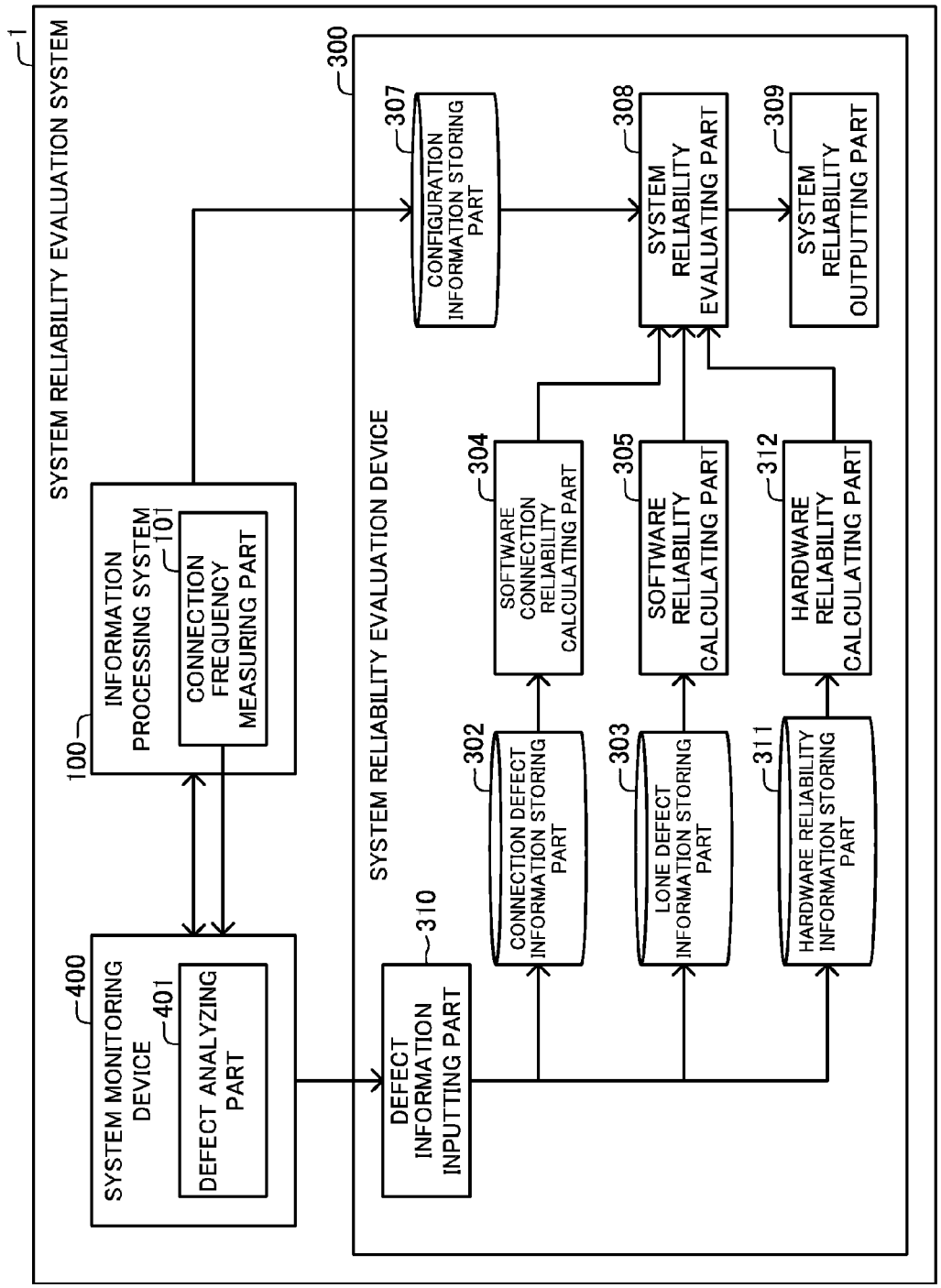
FIG. 6 is a block diagram showing an outline of a function of a system reliability evaluation system according to a second exemplary embodiment of the present invention.

A function of the system reliability evaluation system 1 according to the second exemplary embodiment has a system monitoring device (a defect occurrence informing means) 400 instead of the test executing device 200 as shown in FIG. 6. The system monitoring device 400 includes a defect analyzing part 401.

Further, the system reliability evaluation device 300 in the second exemplary embodiment includes a defect information inputting part 310, a hardware reliability information storing part 311 and a hardware reliability calculating part 312 instead of the count result inputting part 301 and the hardware reliability storing part 306.

The system monitoring device 400 detects occurrence of a defect associated with execution of software in a case that the software is being executed by the information processing system 100 and, when detecting occurrence of the defect, informs it to the user of the system reliability evaluation system 1. To be specific, the system monitoring device 400 acquires information representing the status of a process of the software being executed, and a log, an alert and so on outputted by the software, and detects occurrence of a defect based on the acquired information.

The defect analyzing part 401 offers a tool or the like necessary for the user of the system reliability evaluation system 1 to specify the type of a defect. In this exemplary embodiment, the types of a defect include a first type which is a defect occurring in only a certain software component, a second type which is a defect occurring in a connection between software components, and a third type which is a defect occurring in hardware in which the software is executed.

Furthermore, the system monitoring device 400 has a function like the test execution result counting part 201.

The defect information inputting part 310 inputs (accepts) defect information (lone defect information, connection defect information, and hardware defect information) generated by the system monitoring device 400. Hardware defect information includes time when a defect has occurred in the hardware and information for specifying the hardware causing the defect.

The defect information inputting part 310 stores the inputted connection defect information into the connection defect information storing part 302, stores the inputted lone defect information into the lone defect information storing part 303, and stores the inputted hardware defect information into the hardware reliability information storing part 311.

The hardware reliability information storing part 311 stores the hardware defect information. Moreover, the hardware reliability information storing part 311 previously stores hardware reliability information. In this exemplary embodiment, the hardware reliability information includes information representing a probability that a defect occurs in the hardware (e.g., MTTF (Mean Time To Failure), a fault rate, or the like).

The hardware reliability calculating part 312 calculates hardware reliability based on the hardware defect information and hardware reliability information stored in the hardware reliability information storing part 311. Hardware reliability is a value representing the degree of reliability of each of hardware configuring the information processing system 100 executing the software. In this exemplary embodiment, the hardware reliability calculating part 312 calculates a value decreasing as a probability that a defect occurs in each hardware becomes higher, as hardware reliability.

(Operation)

Next, an operation of the abovementioned system reliability evaluation system 1 will be described.

At first, an operation of the system reliability evaluation system 1 when the system monitoring device 400 monitors a defect having occurred while the information processing system 100 has been executing software will be described with reference to a flowchart shown in FIG. 7.

Figure 2:
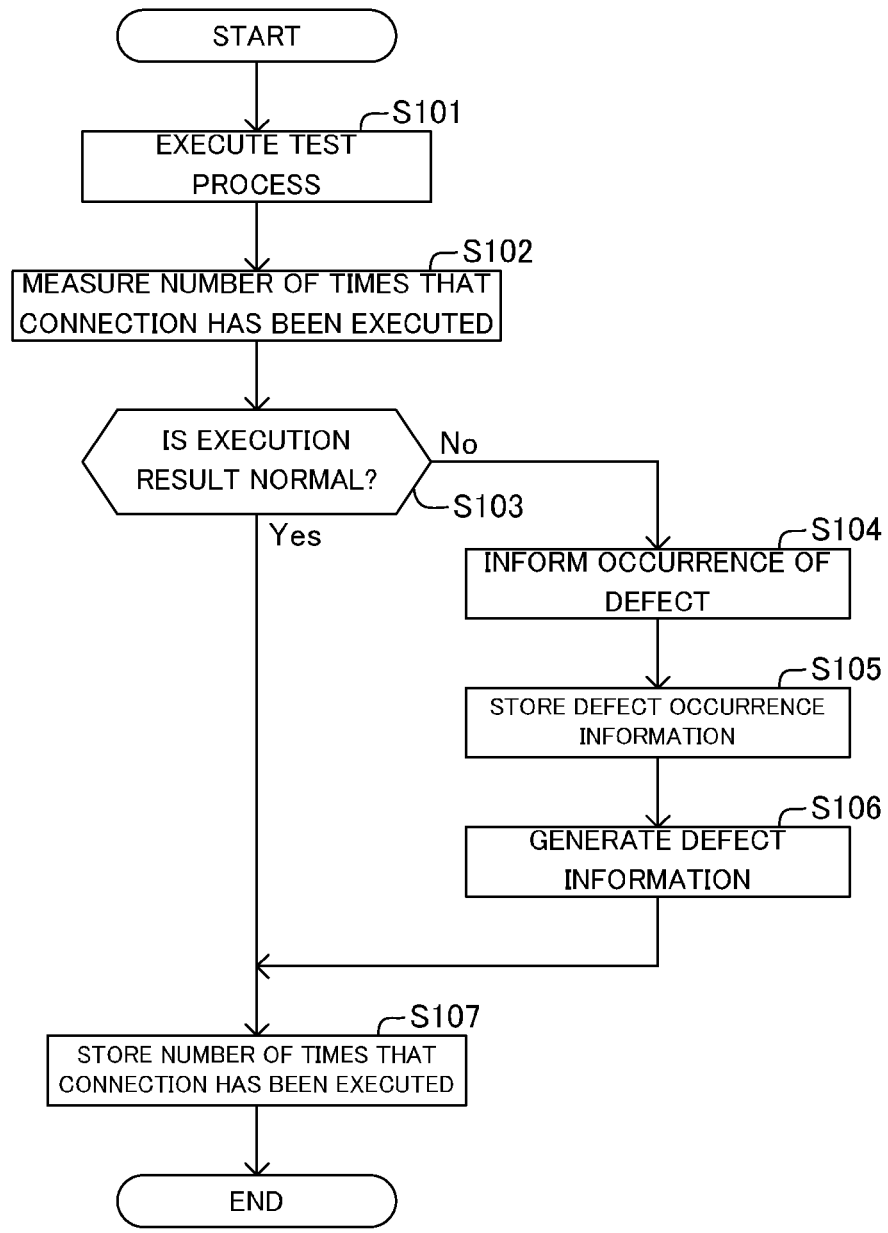
FIG. 2 is a flowchart showing an operation of the system reliability evaluation system according to the first exemplary embodiment of the present invention when executing a test process.
Figure 7:
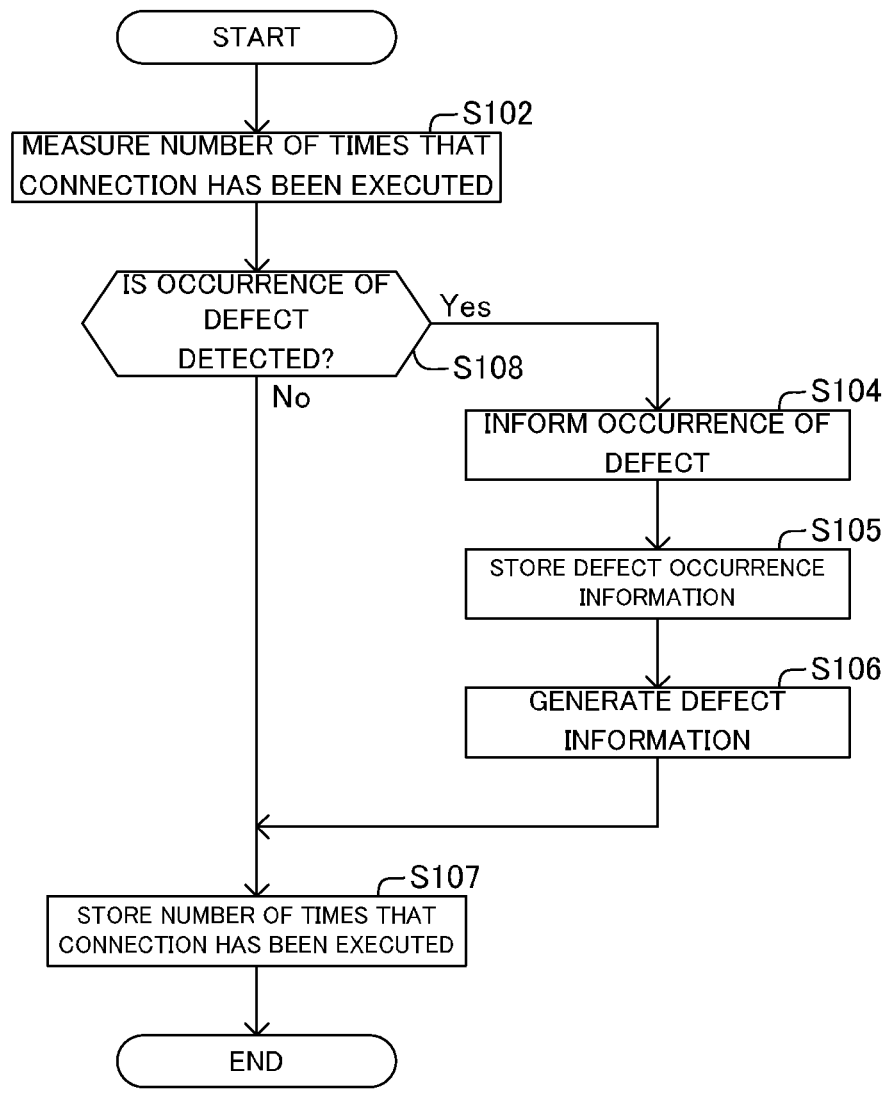
FIG. 7 is a flowchart showing an operation of the system reliability evaluation system according to the second exemplary embodiment of the present invention when a system monitoring device monitors a defect occurring while an information processing system is executing software.

The flowchart of FIG. 7 is a flowchart in which step S101 in the flowchart of FIG. 2 is deleted and step S103 in the flowchart of FIG. 2 is replaced with step S108.

The system monitoring device 400 judges at step S108 whether occurrence of a defect associated with execution of software by the information processing system 100 is detected or not.

In the case of judging "No," the system monitoring device 400 proceeds to step S107. In this case, the system monitoring device 400 stores the number of times that a connection between each pair of software components has been executed.

On the other hand, in the case of judging "Yes," the system monitoring device 400 proceeds to step S104. In this case, the system monitoring device 400 informs occurrence of the defect to the user of the system reliability evaluation system 1.

The user specifies the type of the defect based on the outputted information. Then, the user inputs defect occurrence information (lone defect occurrence information, connection defect occurrence information, or hardware defect occurrence information) via the input device. Consequently, the system monitoring device 400 stores the inputted defect occurrence information (step S105).

The hardware defect occurrence information includes information for specifying hardware in which the defect has occurred, and the time and date when the defect has occurred. Moreover, the hardware defect occurrence information may include the time and date of start of use of the hardware, information representing the use status of (the use frequency) of the hardware, information representing the use environment (e.g., temperature) of the hardware, information for specifying a function being used at the time of occurrence of the defect, and so on.

Then, the system monitoring device 400 counts defect occurrence information stored in the storage device, thereby generating defect information (lone defect information, connection defect information, and hardware defect information) (step S106).

After that, the system monitoring device 400 proceeds to step S107 and stores the number of times that a connection has been executed between each pair of software components.

When informed of occurrence of a defect, the user may replace hardware based on the defect.

Next, with reference to a flowchart shown in FIG. 8, an operation of the system reliability evaluation system 1 at the time of evaluation of system reliability will be described.

Figure 3:
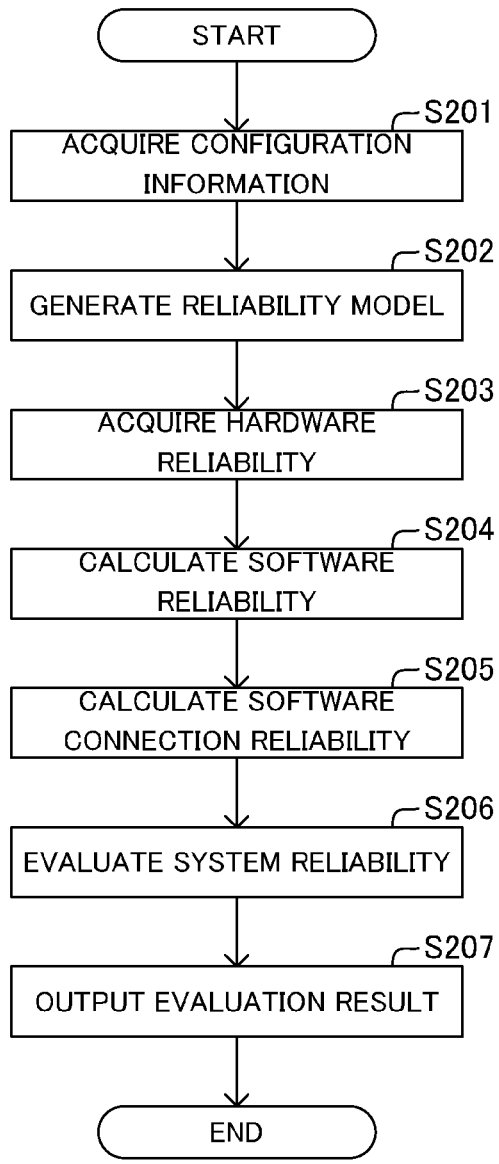
FIG. 3 is a flowchart showing an operation of the system reliability evaluation system according to the first exemplary embodiment of the present invention when evaluating system reliability.
Figure 8:
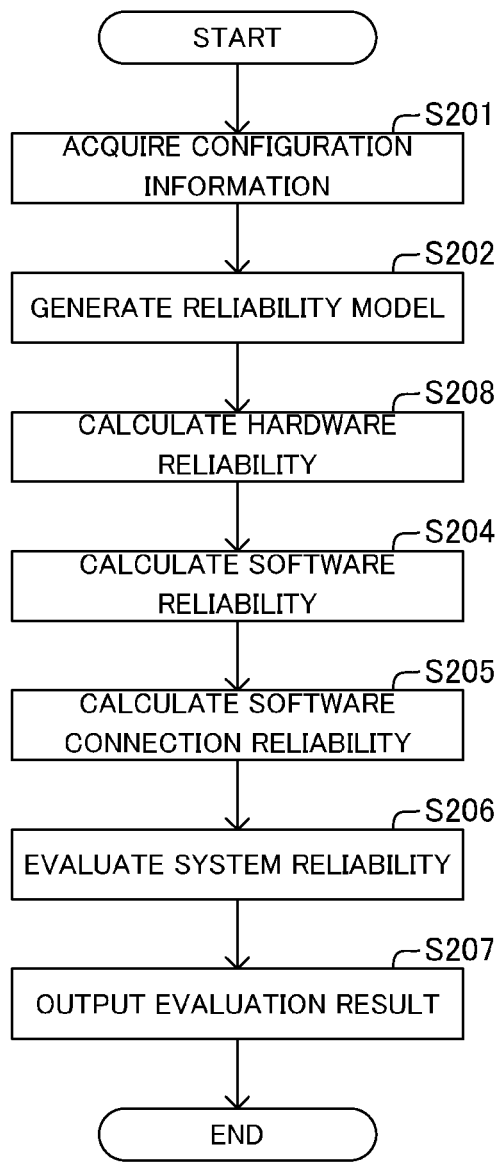
FIG. 8 is a flowchart showing an operation of the system reliability evaluation system according to the second exemplary embodiment of the present invention when evaluating system reliability.

The flowchart of FIG. 8 is a flowchart in which step S203 in the flowchart of FIG. 3 is replaced with step S208.

The hardware reliability calculating part 312 calculates hardware reliability based on hardware defect information and hardware reliability information stored in the hardware reliability information storing part 311 (step S208). The hardware reliability calculating part 312 calculates hardware reliability with respect to each of all hardware used for executing software.

After that, the system reliability evaluating part 308 evaluates system reliability based on the generated reliability model, the calculated hardware reliability, the calculated software reliability, and the calculated software connection reliability (step S206).

Figure 9:
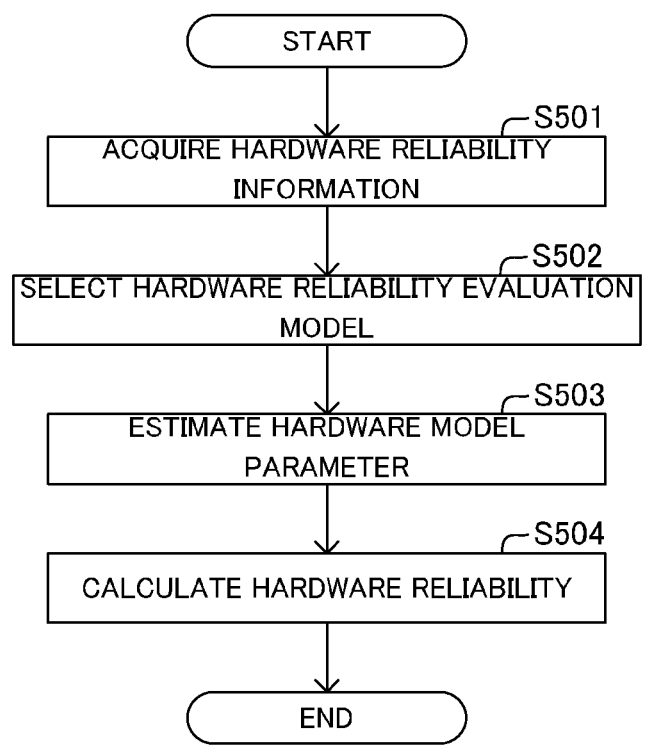
FIG. 9 is a flowchart showing an operation of the system reliability evaluation system according to the second exemplary embodiment of the present invention when calculating hardware reliability.
Figure 10:
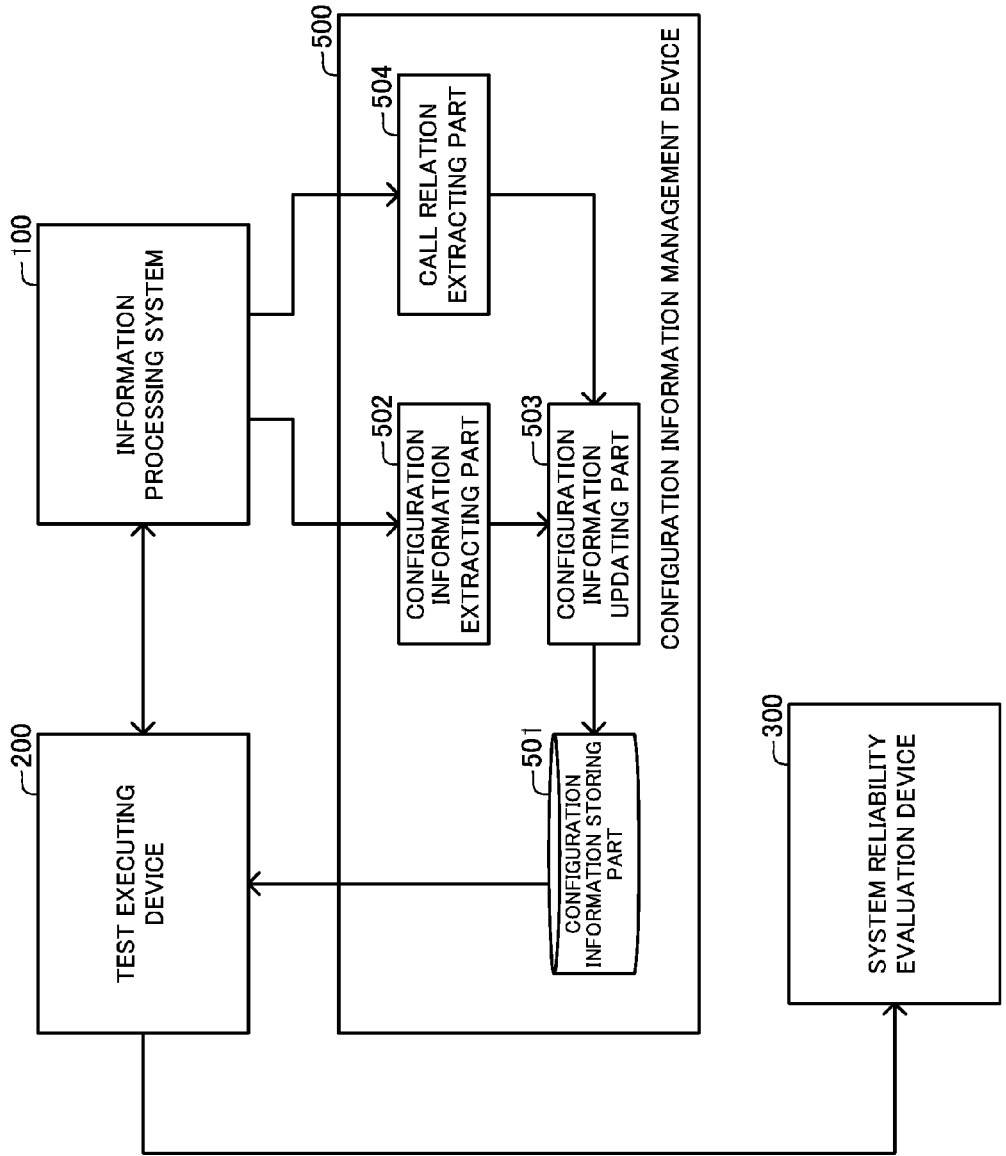
FIG. 10 is a block diagram showing an outline of a function of a system reliability evaluation system according to a third exemplary embodiment of the present invention.

Next, with reference to a flowchart shown in FIG. 9, an operation of the system reliability evaluation system at the time of calculation of hardware reliability (i.e., the operation at step S208) will be described in more detail.

The hardware reliability calculating part 312 acquires hardware reliability information stored in the hardware reliability information storing part 311 (step S501). Then, the hardware reliability calculating part 312 selects a hardware reliability evaluation model based on the hardware defect information stored in the hardware reliability information storing part 311 (step S502).

Next, the hardware reliability calculating part 312 estimates a hardware model parameter for specifying the selected hardware reliability evaluation model, by using the maximum likelihood estimation or the least squares method, based on the hardware defect information stored in the hardware reliability information storing part 311 (step S503).

Next, the hardware reliability calculating part 312 calculates hardware reliability by using the hardware reliability evaluation model specified by the estimated hardware model parameter (step S504).

The hardware reliability calculating part 312 may be configured to, in a case that the number of hardware defect information stored in the hardware reliability information storing part 311 is less than a previously set threshold, calculate hardware reliability based on hardware reliability information stored in the hardware reliability information storing part 311.

As described above, the system reliability evaluation system 1 according to the second exemplary embodiment of the present invention can also produce the same actions and effects as the system reliability evaluation system 1 according to the first exemplary embodiment.

Third Exemplary Embodiment

Next, a system reliability evaluation system according to a third exemplary embodiment of the present invention will be described. Unlike the system reliability evaluation system according to the first exemplary embodiment, the system reliability evaluation system according to the third exemplary embodiment specifies a pair of software components having a relation in which one calls the other from among a plurality of software components and calculates the reliability of software based on connection defect information on a connection between the software components configuring the specified pair. Therefore, a description will be made below focusing on the different point.

The system reliability evaluation system 1 according to the third exemplary embodiment includes a configuration information management device 500 in addition to the configuration of the system reliability evaluation system 1 according to the first exemplary embodiment. The configuration information management device 500 may configure part of the system reliability evaluation device 300.

(Function)

The configuration information management device 500 includes a configuration information storing part 501, a configuration information extracting part 502, a configuration information updating part 503, and a call relation extracting part (a call relation pair specifying means) 504.

The configuration information storing part 501 stores information representing the configuration of hardware in which software is executed, configuration information including information representing the configuration of the software, and so on. Configuration information also includes component connection information for specifying a pair of software components having a relation in which one calls the other from among a plurality of software components.

The configuration information extracting part 502 extracts (acquires) information representing the configuration of hardware and information representing the configuration of software from the information processing system 100.

The configuration information updating part 503 stores the information extracted by the configuration information extracting part 502 and the component connection information acquired by the call relation extracting part 504.

The call relation extracting part 504 extracts a call relation of each pair of software components configuring software. The call relation includes a relation that one directly calls the other among a plurality of software components, and a relation that one calls the other indirectly (via another software component) among a plurality of software components.

In this exemplary embodiment, the call relation extracting part 504 analyzes an environment variable which is a variable defining an environment in which software operates, information specifying an operation of the software (e.g., information in a configuration file), a source code of the software, and so on, thereby extracting a call relation of each pair of software components.

To be specific, the call relation extracting part 504 firstly specifies a direct call relation pair which is a pair of software components having a relation that one directly calls the other from among a plurality of software components. Next, based on the specified direct call relation pair, the call relation extracting part 504 specifies an indirect call relation pair which is a pair of software components having a relation that one indirectly calls the other from among the plurality of software components.

In this exemplary embodiment, the call relation extracting part 504 obtains a transitive closure of a graph formed by a pair of software components specified by a direct call relation pair (i.e., a call graph), thereby specifying an indirect call relation pair.

Then, the call relation extracting part 504 acquires component connection information for specifying a direct call relation pair and an indirect call relation pair.

Further, the test execution result counting part 201 generates connection defect information with respect to each pairs specified by the component connection information included in the configuration information stored in the configuration information storing part 501.

Consequently, the software connection reliability calculating part 304 calculates software connection reliability based on the connection defect information on the connection between the software components configuring the direct call relation pair specified by the call relation extracting part 504, and the connection defect information on the connection between the software components configuring the indirect call relation pair specified by the call relation extracting part 504.

(Operation)

Next, an operation of the abovementioned system reliability evaluation system 1 will be described.

Figure 11:
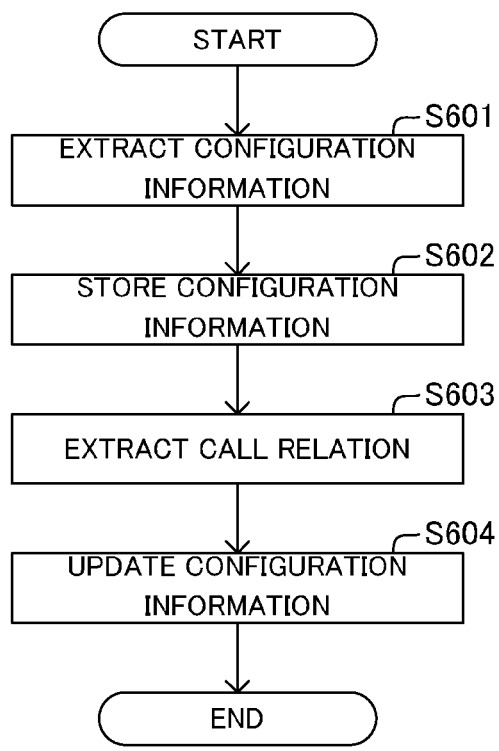
FIG. 11 is a flowchart showing an operation of the system reliability evaluation system according to the third exemplary embodiment of the present invention when a configuration information management device extracts a call relation between software components.

With reference to a flowchart shown in FIG. 11, an operation of the system reliability evaluation system 1 when the configuration information management device 500 extracts a call relation between software components will be described.

At first, the configuration information extracting part 502 extracts (acquires) information representing the configuration of hardware and information representing the configuration of software from the information processing system 100 (step S601).

Next, the configuration information updating part 503 converts the information acquired by the configuration information extracting part 502 into a predetermined data format, and thereafter, stores into the configuration information storing part 501 (step S602).

The configuration information updating part 503 may be configured to, in a case that information that the configuration information extracting part 502 cannot directly extract from the information processing system 100 (e.g., catalog information of the hardware, and information the internal structure of the software) is inputted by the user of the system reliability evaluation system 1, accept the inputted information and store the accepted information into the configuration information storing part 501.

Next, the call relation extracting part 504 extracts a call relation of each pair of software components configuring software (step S603).

The configuration information updating part 503 updates the configuration information stored in the configuration information storing part 501 based on the extracted call relation (i.e., the acquired component update information) (step S604).

As described above, the system reliability evaluation system 1 according to the third exemplary embodiment of the present invention can also produce the same actions and effects as the system reliability evaluation system 1 according to the first exemplary embodiment.

Further, the system reliability evaluation system 1 according to the third exemplary embodiment can evaluate system reliability based on a defect of a connection between software components having a relation that one calls the other indirectly (i.e., via another software component). As a result, it is possible to evaluate system reliability with higher quality.

The system reliability evaluation system 1 according to the third exemplary embodiment is configured to calculate software connection reliability based on both connection defect information on a connection between software components configuring a direct call relation pair and connection defect information on a connection between software components configuring an indirect call relation pair. The system reliability evaluation system 1 according to a modified example of the third exemplary embodiment may be configured to calculate software reliability based on only connection defect information on a connection between software components configuring a direct call relation pair.

Fourth Exemplary Embodiment

Next, a system reliability evaluation system according to a fourth exemplary embodiment of the present invention will be described. Unlike the system reliability evaluation system according to the third exemplary embodiment, in the system reliability evaluation system according to the fourth exemplary embodiment, a virtualized device executes a process. Therefore, a description will be made below focusing on the different point.

(Configuration)

Figure 12:
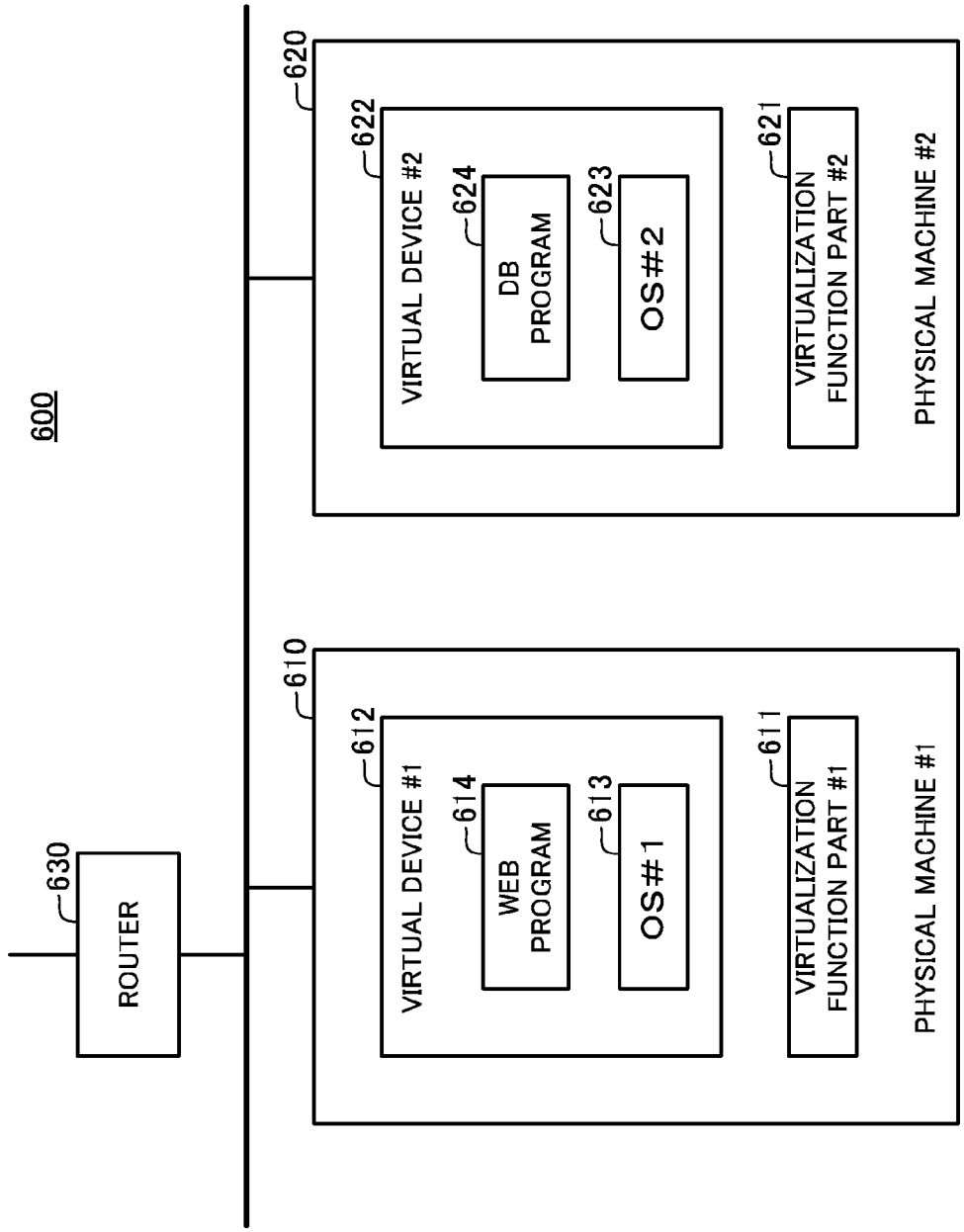
FIG. 12 is a diagram showing a schematic configuration of an information processing system according to a fourth exemplary embodiment of the present invention.

As shown in FIG. 12, a system reliability evaluation system 600 according to the fourth exemplary embodiment includes a plurality of (in this exemplary embodiment, two) physical machines 610 and 620, and a router 630. The respective physical machines 610 and 620 are information processing devices. The respective physical machines 610 and 620 are connected so as to be capable of communication with each other via the router 630. The physical machine 610 is also expressed as a physical machine #1, and the physical machine 620 is also expressed as a physical machine #2.

The physical machine 610 and the physical machine 620 realize an information processing system. In this exemplary embodiment, software executed by the information processing system is software which provides Web application service.

A function of the physical machine 610 includes a virtualization function part 611. The virtualization function part 611 realizes a virtual device 612 serving as a virtualized information processing device. The virtual device 612 executes OS (Operating System) 613, and also executes Web program 614 serving as an application program using a function provided by the OS 613. The Web program 614 configures a software component.

Likewise, a function of the physical machine 620 includes a virtualization function part 621. The virtualization function part 621 realizes a virtual device 622 serving as a virtualized information processing device. The virtual device 622 executes OS (Operating System) 623, and also executes DB (Database) program 624 serving as an application program using a function provided by the OS 623. The DB program 624 configures a software component.

The virtualization function part 611 is also expressed as a virtualization function part #1, and the virtualization function part 621 is also expressed as a virtualization function part #2. Moreover, the virtual device 612 is also expressed as a virtual device #1, and the virtual device 622 is also expressed as a virtual device #2. Moreover, the OS 613 is also expressed as OS #1, and the OS 623 is also expressed as OS #2.

Further, in this exemplary embodiment, each of the OS #1, the OS #2, the virtualization function part #1, and the virtualization function part #2 also configures a software component.

By execution of the Web program 614 by the virtual device #1, a Web server is configured. Likewise, by execution of the DB program 624 by the virtual device #2, a DB server is configured.

The Web program 614 executed by the virtual device #1 transmits data to the DB program 624 executed by the virtual device #2. The DB program 624 executed by the virtual device #2 stores the received data. Thus, the Web program and the DB program are connected with each other to operate.

In this exemplary embodiment, the system reliability evaluation system 600 includes the test executing device 200 and the system reliability evaluation device 300, which are not shown in the drawings.

(Operation)

Next, an operation of the abovementioned system reliability evaluation system 600 will be described.

Figure 13:
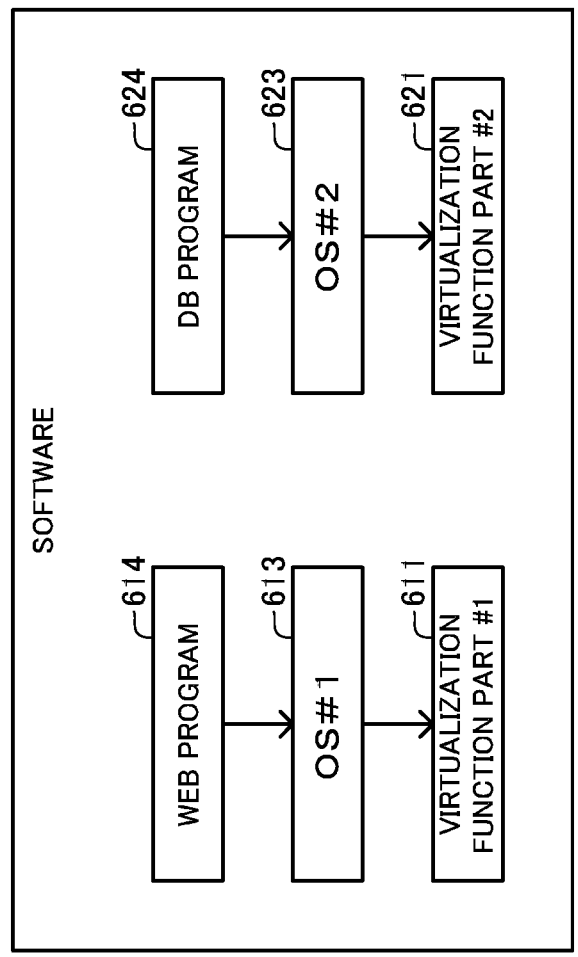
FIG. 13 is an explanation view conceptually showing a direct call relation pair specified by a call relation extracting part according to the fourth exemplary embodiment of the present invention.

At first, the call relation extracting part 504 specifies a direct call relation pair as shown in FIG. 13. FIG. 13 is an explanation view (a call graph) conceptually showing the direct call relation pair specified by the call relation extracting part 504. In this exemplary embodiment, FIG. 13 shows that the Web program 614 directly calls the OS 613, the OS 613 directly calls the virtualization function part 611, the DB program 624 directly calls the OS 623, and the OS 623 directly calls the virtualization function part 621.

Further, the call relation extracting part 504 specifies an indirect call relation pair as shown in FIG. 14. FIG. 14 is a view in which the indirect call relation pair specified by the call relation extracting part 504 is added to the call graph shown in FIG. 13. In this exemplary embodiment, FIG. 14 shows that the Web program 614 indirectly calls the virtualization function part 611, and the DB program 624 indirectly calls the virtualization function part 621.

The configuration information storing part 501 stores configuration information that includes component connection information for specifying the direct call relation pair and indirect call relation pair shown in FIG. 14.

The test executing device 200 causes software executed by the information processing system 100 to execute a predetermined test process. In the case of detecting occurrence of a defect, the test executing device 200 informs the occurrence of the defect to the user of the system reliability evaluation system 600.

The user specifies the type of the defect based on the outputted information. Then, the user inputs defect occurrence information (lone defect occurrence information or connection defect occurrence information) via the input device. Consequently, the test executing device 200 stores the inputted defect occurrence information.

FIG. 15 is a table showing an example of lone defect occurrence information. Lone defect occurrence information shown on line 1 is information representing that a defect has occurred in "Web program" as a software component at time and date "2010/2/12 10:00" when a test process according to a "user input A" as a test scenario has been executed. Moreover, the lone defect occurrence information includes information representing the detailed content of the defect.

Further, FIG. 16 is a table showing an example of connection defect occurrence information. Connection defect occurrence information shown on line 1 is information representing that a defect has occurred in a connection between the "Web program" and the "DB program" at time and date "2010/2/12 10:00." Moreover, the connection defect occurrence information represents that a connection between the "Web program" and the "DB program" has been executed five times before detection of the defect. Besides, the connection defect occurrence information includes information representing the detailed content of the defect.

Figure 17:
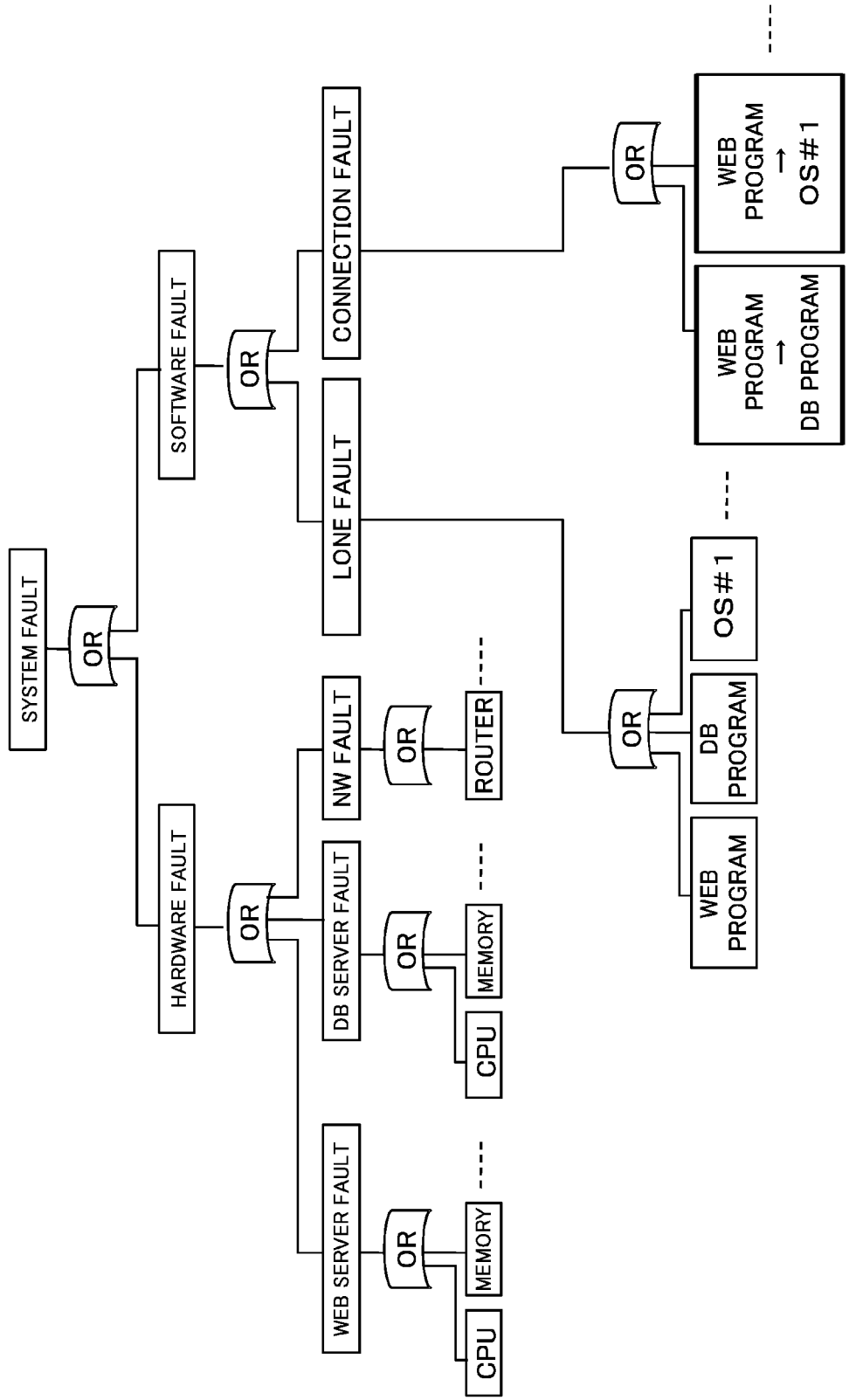
FIG. 17 is an explanation view conceptually showing a fault tree as a reliability model according to the fourth exemplary embodiment of the present invention.

Furthermore, the system reliability evaluating part 308 generates a reliability model with reference to configuration information. In this exemplary embodiment, the reliability model is a fault tree as shown in FIG. 17.

This fault tree shows that a fault in hardware (a hardware fault) and a fault in software (a software fault) exist as the causes of a system fault which is a fault (a defect) of the whole information processing system 100.

Further, this fault tree shows that a fault in the physical machine #1 serving as a Web server (a Web server fault), a fault in the physical machine #2 serving as a DB server (a DB server fault), and a fault in a communication between the physical machine #1 and the physical machine #2 (a NW fault) exist as hardware faults.

Each of the Web server fault and the DB server fault includes a fault in a component (a CPU, a memory and the like) of each of the physical machines. Moreover, the NW fault includes a fault in the router 630.

On the other hand, software faults include a fault in only a software component (a lone fault) and a fault in a connection between software components (a connection fault).

The system reliability evaluating part 308 acquires hardware reliability stored in the hardware reliability storing part 306. FIG. 18 shows an example of the hardware reliability stored in the hardware reliability storing part 306. In this example, the hardware reliability of the CPU of the physical machine #1 is "0.99997," and the hardware reliability of the memory of the physical machine #1 is "0.99996."

The software reliability calculating part 305 calculates software reliability based on lone defect information stored in the lone defect information storing part 303. FIG. 19 shows an example of the software reliability calculated by the software reliability calculating part 305. In this example, the software reliability with respect to the Web program is "0.9995," the software reliability with respect to the DB software is "0.9998," and the software reliability with respect to the OS #1 is "0.9999."

Next, the software connection reliability calculating part 304 calculates the software connection reliability based on the connection defect information stored in the connection defect information storing part 302. FIG. 20 shows an example of the software connection reliability calculated by the software connection reliability calculating part 304.

In this example, the software connection reliability regarding a connection between the Web program and the DB program when the Web program calls the DB program is "0.9995," the software connection reliability regarding a connection between the Web program and the OS #1 when the Web program calls the OS #1 is "0.9998," and the software connection reliability regarding a connection between the OS #1 and the virtualized function part #1 when the OS #1 calls the virtualized function part #1 is "0.9999."

Then, the system reliability evaluating part 308 evaluates system reliability based on the generated reliability model, the acquired hardware reliability, the calculated software reliability and the calculated software connection reliability. In this example, the system reliability evaluating part 308 obtains "0.997" as system reliability which is a parameter representing the degree of the system reliability. Then, the system reliability outputting part 309 outputs the calculated system reliability via the output device.

As described above, the system reliability evaluation system 600 according to the fourth exemplary embodiment of the present invention can also produce the same actions and effects as the system reliability evaluation system 1 according to the third exemplary embodiment.

The system reliability evaluation system 600 according to the fourth exemplary embodiment may be configured to estimate the degree of change of the system reliability of the information processing system 100 in accordance with a software component or a change of a call relation between software components. Accordingly, it is possible to estimate a test period, the number of times that a test is executed or the like required for satisfying a criterion value of system reliability previously set, with high accuracy.

Fifth Exemplary Embodiment

Figure 21:
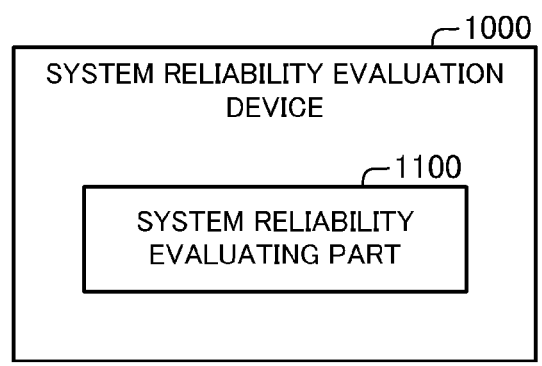
FIG. 21 is a block diagram showing an outline of a function of a system reliability evaluation device according to a fifth exemplary embodiment of the present invention.

Next, a system reliability evaluation device according to a fifth exemplary embodiment of the present invention will be described with reference to FIG. 21.

A system reliability evaluation device 1000 according to the fifth exemplary embodiment includes a system reliability evaluating part (a system reliability evaluating means) 1100 for evaluating system reliability which is the reliability of an information processing system executing software, based on connection defect information including the number of times that a defect has occurred in a connection between software components among a plurality of software components operating in connection with each other.

According to this, based on the number of times that a defect has occurred in a connection between software components among a plurality of software components configuring software, it is possible to evaluate system reliability. As a result, while preventing a processing load for evaluating system reliability from becoming too large, it is possible to evaluate system reliability with high accuracy.

Although the present invention has been described above with reference to the exemplary embodiments, the present invention is not limited to the above exemplary embodiments. The configurations and details of the present invention can be altered in various manners that can be understood by those skilled in the art within the scope of the present invention.

In the exemplary embodiments described above, the system reliability evaluation device 300 is configured to evaluate system reliability based on all of software reliability, software connection reliability and hardware reliability, but may be configured to evaluate system reliability based on only software reliability and software connection reliability.

In the exemplary embodiments described above, the system reliability evaluation device 300 is realized by execution of a program (software) by the CPU, but may be realized by hardware such as a circuit.

Further, in the exemplary embodiments described above, the program is stored in the storage device, but may be stored on a computer-readable recording medium. For example, the recording medium is a portable medium such as a flexible disk, an optical disk, a magneto-optical disk and a semiconductor memory.

Further, as a modified example of the exemplary embodiments described above, any combination of the exemplary embodiments and modified examples may be employed.

[Supplementary Notes]

The whole or part of the exemplary embodiments disclosed above can be described as, but not limited to, the following supplementary notes.

(Supplementary Note 1)

A system reliability evaluation device, comprising a system reliability evaluating means for evaluating system reliability which is reliability of an information processing system executing software, based on connection defect information including a number of times that a defect has occurred in a connection between software components among a plurality of software components operating in connection with each other.

According to this, based on the number of times that a defect has occurred in a connection between software components among a plurality of software components configuring software, it is possible to evaluate the reliability (system reliability) of an information processing system executing the software (e.g., calculate a parameter (the operation rate of the information processing system, the probability that the information processing system can normally execute a requested process, or the like) representing the degree of the system reliability). As a result, while preventing a processing load for evaluating the system reliability from becoming too large, it is possible to evaluate the system reliability with high accuracy.

(Supplementary Note 2)

The system reliability evaluation device according to Supplementary Note 1, wherein the system reliability evaluating means is configured to calculate software connection reliability which is reliability of the connection between the software components based on the connection defect information, and evaluate the system reliability based on the calculated software connection reliability.

There is a case that the relation between the number of times that a defect has occurred in a connection between software components and the system reliability is different from the relation between the number of times that a defect has occurred in the whole software and the system reliability, or different from the relation between the number of times that a defect has occurred in only each of the software components and the system reliability. Therefore, according to the system reliability evaluation device configured as described above, it is possible to evaluate the system reliability with higher accuracy.

(Supplementary Note 3)

The system reliability evaluation device according to Supplementary Note 2, wherein the system reliability evaluating means is configured to estimate a connection model parameter which is a parameter for specifying a model representing a relation between a number of times that the connection between the software components has been executed and the number of times that a defect has occurred in the connection, based on the connection defect information, and calculate the software connection reliability by using the model specified by the estimated connection model parameter.

(Supplementary Note 4)

The system reliability evaluation device according to Supplementary Note 3, comprising a connection frequency measuring means for measuring the number of times that the connection between the software components has been executed, wherein the system reliability evaluating means is configured to estimate the connection model parameter based on the measured number of times.

(Supplementary Note 5)

The system reliability evaluation device according to any of Supplementary Notes 1 to 4, wherein the system reliability evaluating means is configured to evaluate the system reliability based on either or both of lone defect information which is information with respect to each of the plurality of software components and is information including a number of times that a defect has occurred in only the software component, and hardware defect information including a number of times that a defect has occurred in hardware in which the software is executed, and based on the connection defect information.

(Supplementary Note 6)

The system reliability evaluation device according to any of Supplementary Notes 1 to 5, comprising a call relation pair specifying means for specifying a direct call relation pair which is a pair of the software components having a relation that one directly calls the other, wherein the system reliability evaluating means is configured to evaluate the system reliability based on the connection defect information relating to a connection between the software components configuring the specified direct call relation pair.

(Supplementary Note 7)

The system reliability evaluation device according to Supplementary Note 6, wherein:

the call relation pair specifying means is configured to specify an indirect call relation pair which is a pair of the software components having a relation that one indirectly calls the other from among the plurality of software components, based on the specified direct call relation pair; and the system reliability evaluating means is configured to evaluate the system reliability based on the connection defect information relating to the connection between the software components configuring the specified direct call relation pair and based on the connection defect information relating to a connection between the software components configuring the specified indirect call relation pair.

According to this, based on a defect in a connection between software components having a relation that one calls the other indirectly (i.e., via another software component). As a result, it is possible to evaluate the system reliability with higher accuracy.

(Supplementary Note 8)

A system reliability evaluation system, comprising a system reliability evaluating means for evaluating system reliability which is reliability of an information processing system executing software, based on connection defect information including a number of times that a defect has occurred in a connection between software components among a plurality of software components operating in connection with each other.

(Supplementary Note 9)

The system reliability evaluation system according to Supplementary Note 8, wherein the system reliability evaluating means is configured to calculate software connection reliability which is reliability of the connection between the software components based on the connection defect information, and evaluate the system reliability based on the calculated software connection reliability.

(Supplementary Note 10)

The system reliability evaluation system according to Supplementary Note 9, wherein the system reliability evaluating means is configured to estimate a connection model parameter which is a parameter for specifying a model representing a relation between a number of times that the connection between the software components has been executed and the number of times that a defect has occurred in the connection, based on the connection defect information, and calculate the software connection reliability by using the model specified by the estimated connection model parameter.

(Supplementary Note 11)

The system reliability evaluation system according to any of Supplementary Notes 8 to 10, comprising a test executing means for causing the software to execute a predetermined test process and, in a case that execution of the test process has not been normally completed, informing occurrence of a defect to a user.

(Supplementary Note 12)

The system reliability evaluation system according to any of Supplementary Notes 8 to 10, comprising a defect occurrence informing means for detecting occurrence of a defect while the software is being executed and informing when the occurrence of the defect has been detected.

(Supplementary Note 13)

A system reliability evaluation method, comprising evaluating system reliability which is reliability of an information processing system executing software, based on connection defect information including a number of times that a defect has occurred in a connection between software components among a plurality of software components operating in connection with each other.

(Supplementary Note 14)

The system reliability evaluation method according to Supplementary Note 13, comprising: calculating software connection reliability which is reliability of the connection between the software components based on the connection defect information; and evaluating the system reliability based on the calculated software connection reliability.

(Supplementary Note 15)

The system reliability evaluation method according to Supplementary Note 14, comprising: estimating a connection model parameter which is a parameter for specifying a model representing a relation between a number of times that the connection between the software components has been executed and the number of times that a defect has occurred in the connection, based on the connection defect information; and calculating the software connection reliability by using the model specified by the estimated connection model parameter.

(Supplementary Note 16)

A computer-readable recording medium storing a system reliability evaluation program comprising instructions for causing an information processing device to realize a system reliability evaluating means for evaluating system reliability which is reliability of an information processing system executing software, based on connection defect information including a number of times that a defect has occurred in a connection between software components among a plurality of software components operating in connection with each other.

(Supplementary Note 17)

The recording medium according to Supplementary Note 16, wherein the system reliability evaluating means is configured to calculate software connection reliability which is reliability of the connection between the software components based on the connection defect information, and evaluate the system reliability based on the calculated software connection reliability.

(Supplementary Note 18)

The recording medium according to Supplementary Note 17, wherein the system reliability evaluating means is configured to estimate a connection model parameter which is a parameter for specifying a model representing a relation between a number of times that the connection between the software components has been executed and the number of times that a defect has occurred in the connection, based on the connection defect information, and calculate the software connection reliability by using the model specified by the estimated connection model parameter.

The present invention is based upon and claims the benefit of priority from Japanese patent application No. 2010-091956, filed on Apr. 13, 2010, the disclosure of which is incorporated herein in its entirety by reference.

INDUSTRIAL APPLICABILITY

The present invention can be applied to, for example, a system reliability evaluation device evaluating the reliability of an information processing system executing software.

DESCRIPTION OF REFERENCE NUMERALS 1 system reliability evaluation system
100 information processing system
101 connection frequency measuring part
200 test executing device
201 text execution result counting part
300 system reliability evaluation device
301 count result inputting part
302 connection defect information storing part
303 lone defect information storing part
304 software connection reliability calculating part
305 software reliability calculating part
306 hardware reliability storing part
307 configuration information storing part
308 system reliability evaluating part
309 system reliability outputting part
310 defect information inputting part
311 hardware reliability information storing part
312 hardware reliability calculating part
400 system monitoring device
401 defect analyzing part
500 configuration information management device
501 configuration information storing part
502 configuration information extracting part
503 configuration information updating part
504 call relation extracting part
600 system reliability evaluation system
610 physical machine
611 virtualization function part
612 virtual device
614 Web program
620 physical machine
621 virtualization function part
622 virtual device
623 OS
624 DB program
630 router
1000 system reliability evaluation device
1100 system reliability evaluating part

The invention claimed is:

1. A computer-implemented system reliability evaluation method, comprising evaluating system reliability which is reliability of an information processing system executing software, based on connection defect information generated with respect to a pair of software components, which includes a number of times that a defect has occurred in a connection between software components among a plurality of software components operating in connection with each other, wherein
the evaluating comprises calculating software connection reliability, which is reliability of the connection between the software components, based on the connection defect information, and evaluating the system reliability based on the calculated software connection reliability and software reliability representing a degree of reliability of only a software component being calculated based on lone defect occurrence information including a number of times that a defect has occurred in only the software component, and
wherein the evaluating comprises estimate a connection model parameter which is a parameter for specifying a model representing a relation between a number of times that the connection between the software components has been executed and the number of times that a defect has occurred in the connection, based on the connection defect information, and calculate the software connection reliability by using the model specified by the estimated connection model parameter.

2. A system reliability evaluation device having a processor, comprising a system reliability evaluating unit for evaluating system reliability which is reliability of an information processing system executing software, based on connection defect information generated with respect to a pair of software components, which includes a number of times that a defect has occurred in a connection between software components among a plurality of software components operating in connection with each other, wherein
the system reliability evaluating unit is configured to calculate software connection reliability, which is reliability of the connection between the software components based on the connection defect information, and to evaluate the system reliability based on the calculated software connection reliability and software reliability representing a degree of reliability of only a software component being calculated based on lone defect occurrence information including a number of times that a defect has occurred in only the software component, and
wherein the system reliability evaluating unit is configured to estimate a connection model parameter which is a parameter for specifying a model representing a relation between a number of times that the connection between the software components has been executed and the number of times that a defect has occurred in the connection, based on the connection defect information, and calculate the software connection reliability by using the model specified by the estimated connection model parameter.

3. The system reliability evaluation device according to claim 2, comprising a connection frequency measuring unit for measuring the number of times that the connection between the software components has been executed, wherein the system reliability evaluating unit is configured to estimate the connection model parameter based on the measured number of times.

4. The system reliability evaluation device according to claim 2, wherein the system reliability evaluating unit is configured to evaluate the system reliability based on either or both of lone defect information which is information with respect to each of the plurality of software components and is information including a number of times that a defect has occurred in only the software component, and hardware defect information including a number of times that a defect has occurred in hardware in which the software is executed, and based on the connection defect information.

5. The system reliability evaluation device according to claim 2, comprising a call relation pair specifying unit for specifying a direct call relation pair which is a pair of the software components having a relation that one directly calls the other, wherein the system reliability evaluating unit is configured to evaluate the system reliability based on the connection defect information relating to a connection between the software components configuring the specified direct call relation pair.

6. The system reliability evaluation device according to claim 5, wherein:
  the call relation pair specifying unit is configured to specify an indirect call relation pair which is a pair of the software components having a relation that one indirectly calls the other from among the plurality of software components, based on the specified direct call relation pair; and
  the system reliability evaluating unit is configured to evaluate the system reliability based on the connection defect information relating to the connection between the software components configuring the specified direct call relation pair and based on the connection defect information relating to a connection between the software components configuring the specified indirect call relation pair.

7. A system reliability evaluation system having a processor, comprising a system reliability evaluating unit for evaluating system reliability which is reliability of an information processing system executing software, based on connection defect information generated with respect to a pair of software components, which includes a number of times that a defect has occurred in a connection between software components among a plurality of software components operating in connection with each other, wherein
  the system reliability evaluating unit is configured to calculate software connection reliability, which is reliability of the connection between the software components based on the connection defect information, and to evaluate the system reliability based on the calculated software connection reliability and software reliability representing a degree of reliability of only a software component being calculated based on lone defect occurrence information including a number of times that a defect has occurred in only the software component, and
  wherein the system reliability evaluating unit is configured to estimate a connection model parameter which is a parameter for specifying a model representing a relation between a number of times that the connection between the software components has been executed and the number of times that a defect has occurred in the connection, based on the connection defect information, and calculate the software connection reliability by using the model specified by the estimated connection model parameter.

8. The system reliability evaluation system according to claim 7, comprising a test executing unit for causing the software to execute a predetermined test process and, in a case that execution of the test process has not been normally completed, informing occurrence of a defect to a user.

9. The system reliability evaluation system according to claim 7, comprising a defect occurrence informing unit for detecting occurrence of a defect while the software is being executed and informing when the occurrence of the defect has been detected.

* * * * *